United States Patent

[11] 3,585,413

| [72] | Inventors | Yukio Nakagome;<br>Yasuo Koseki; Takao Tanaka, all of Tokyo-to, Japan |
|---|---|---|
| [21] | Appl. No. | 758,484 |
| [22] | Filed | Sept. 9, 1968 |
| [45] | Patented | June 15, 1971 |
| [73] | Assignee | Kokusai Denshin Denwa Kabushiki Kaisha Tokyo-to, Japan |
| [32] | Priority | Sept. 13, 1967 |
| [33] | | Japan |
| [31] | | 42/58331 |

[54] OPTICAL LOGIC CIRCUIT
7 Claims, 9 Drawing Figs.

[52] U.S. Cl............................................... 307/312,
250/213, 307/214, 307/218, 307/221, 331/94.5

[51] Int. Cl.................................................. H03k 19/00
[50] Field of Search.......................................... 307/312,
214, 218, 221; 250/213 A

*Primary Examiner*—John Kominski
*Assistant Examiner*—Darwin R. Hostetter
*Attorneys*—Robert E. Burns and Emmanuel J. Lobato ABSTRACT: A optical logic circuit comprising a plurality of groups connected in cascade arrangement, where each of the groups comprises at least one bistable laser, the plural groups being pumped by polyphase pumping inputs which are successively switched at overlapped periods, two outputs of at least one bistable laser of a preceding group are employed to quench respectively different laser elements of at least one bistable laser of a just succeeding group.

OPTICAL LOGIC CIRCUIT

This invention relates to optical logic circuits using laser elements.

In the conventional optical logic circuits of the type, there are employed a controlled laser element and at least one controlling laser element. The output or outputs of the controlling laser element or elements is/are applied to the controlled laser element to quench the laser action of the controlled laser element. If the pumping energy level of the controlled laser element is established at an appropriate value, the laser action of the controlled laser element can be stopped by the application of the quenching input from the controlling laser element or by the simultaneous application of the quenching inputs from the controlling laser elements. In such conventional circuits, since the pumping energy is continuously supplied to the controlled laser element, the laser action of the controlled laser element is quenched by the quenching input or inputs only, while the quenching input has to have a relatively large energy level to quench the laser action of an oscillating laser element. Accordingly, the conventional optical logic circuits have such disadvantages that the quenching input has to have a relatively large energy level and that the fluctuation of the quenching input level has a great influence on the logic operation of the optical logic circuits.

An object of this invention is to provide optical logic circuits eliminatable of said disadvantages of the conventional optical logic circuits.

The optical logic circuit of this invention attainable of the above-mentioned object has the following features:

1. The optical logic circuit of this invention comprises a plurality of bistable laser elements (laser Flip-Flop) divided into a plurality of groups (i.e.; a controlling group and a controlled group) connected in cascade arrangement.
2. The plural groups are pumped by polyphase (e.g.; two-phase) pumping inputs which are successively switched at overlapped periods.
3. Two outputs of each of the bistable laser elements have complement-relationship to each other and are employed to carry out the binary logic operation of the optical logic circuit.

By adopting the above-mentioned features, the optical logic circuit of this invention is able to perform reliably the logic operation by use of small quenching input or inputs.

The principle of the present invention will be better understood from the following more detailed discussion taken in conjunction with the accompanying drawings, in which the same or equivalent parts are designated by the same reference numerals, characters and symbols as to one another, and in which.

Figures 1A, 1B:
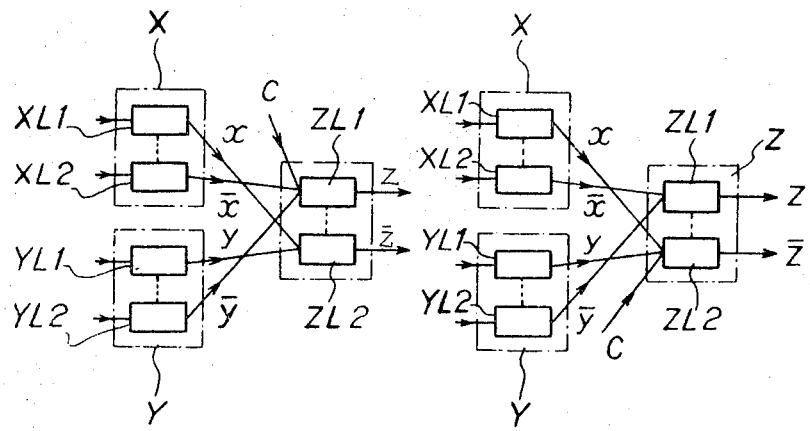
FIG. 1A shows a block diagram of an embodiment of the optical logic circuit of this invention to form an AND circuit.
FIG. 1B shows a block diagram of an embodiment of the optical logic circuit of this invention to form an OR circuit.
Figure 2:
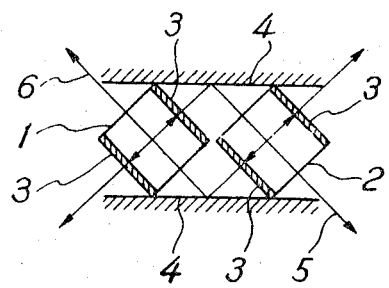
FIG. 2 shows a sectional view of an example of a bistable laser employed to form the optical logic circuit of this invention.
Figure 3:
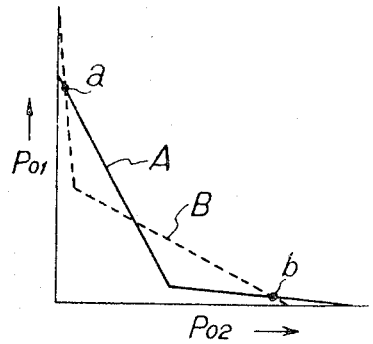
FIG. 3 shows a characteristic of the bistable laser illustrated in FIG. 2.

An embodiment of this invention comprises, as shown in FIG. 1A, controlling bistable lasers X and Y and a controlled bistable laser Z. Each of these bistable lasers X, Y and Z comprises two-laser elements two outputs of which are respectively applied to the other laser elements to quench them so that only one of the two-laser elements is oscillatable. An example of the bistable laser comprises, as shown in FIG. 2, laser elements 1 and 2 and a pair of opposed mirrors 4. Each of the laser elements 1 and 2 has a pair of reflectors 3 which form a light resonator. The laser element 1 generates an output light 5 and the laser element 2 generates an output light 6. The reflective mirrors 4 are employed to apply the output lights 5 and 6, as the quenching inputs, to the other laser elements 6 and 5 respectively. The characteristic of this bistable laser are illustrated in FIG. 3 by way of example. In this FIG. 3, the abscissa ($P_{02}$) is the output level of the laser element 2 and the ordinate ($P_{01}$) is the output level of the laser element 1. Bent lines A and B show respectively the characteristics of the laser elements 1 and 2. As understood from this FIG. 3, the bistable laser has two stable points $a$ and $b$. At the point $a$, the laser element 1 oscillates while the laser element 2 is quenched. At the point $b$, the laser element 2 oscillates while the laser element 1 is quenched.

The bistable laser X comprises laser elements XL1 and XL2 in which only one oscillates because the other is quenched by the oscillating laser element. The bistable laser Y comprises similarly laser elements YL1 and YL2, and the bistable laser Z comprises laser elements ZL1 and ZL2. In this case, if the output of the laser element XL1 is assumed as a notation $x$, the output of the laser element XL2 is representative of a notation $\bar{x}$. In other words, the existence and nonexistence of the output are representative of binary signals $x$ and $\bar{x}$ respectively. The outputs of the laser elements YL1 and YL2 are representative of notations $y$ and $\bar{y}$ respectively, and the outputs of the laser elements ZL1 and ZL2 are similarly representative of notations $z$ and $\bar{z}$ respectively.

Figure 4:
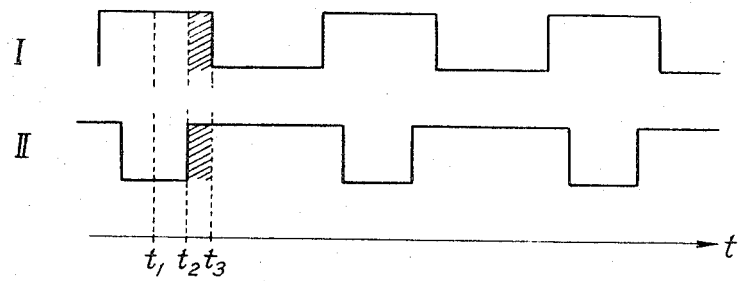
FIG. 4 shows a time chart for illustrating examples of polyphase pumping inputs to pump the optical logic circuit of this invention.

In the embodiment shown in FIG. 1A, the bistable lasers X and Y form a controlling group and the bistable laser Z forms a controlled groups. These two groups are respectively pumped by a polyphase pumping inputs (e.g.; two phase-pumping inputs) as shown in FIG. 4. In case of two-phase pumping inputs, a phase–I pumping input and a phase–II pumping input are alternately switched at overlapped periods illustrated by hatching in FIG. 4. By adopting these pumping inputs, since the outputs $x$, $\bar{x}$, $y$ and $\bar{y}$ (the quenching inputs) are applied to the controlled bistable laser Z prior to the oscillation of the controlled bistable laser Z, the state of the bistable laser Z can be controlled by the small levels of the quenching inputs. This merit can be obtained since the state of the bistable laser can be generally controlled by the small level of the quenching input at the rise time of the oscillation of the controlled bistable laser. In this case, a laser element receiving a larger quenching input is quenched and the other laser element receiving a smaller quenching input oscillates. Moreover, since the quenching input is employed to determine which laser element oscillates in the bistable laser, the small fluctuation of level of the quenching input has no effect on the operation of the controlled bistable laser Z.

The operation of the embodiment shown in FIG. 1A is described below in case of pumping by the two-phase pumping inputs as shown in FIG. 4. In this case, it is assumed that the phase–I pumping input is supplied to the bistable lasers X and Y and employed as a constant input C and the phase–II pumping input is supplied to the bistable laser Z. At a time $t_1$, the bistable lasers X and Y are pumped so that either laser element XL1 or XL2 and either laser element YL1 or YL2 oscillate. The state of the bistable lasers X and Y are determined by quenching inputs from the just preceding stage. On the contrary, the bistable laser Z does not oscillate. Now, if it is assumed that $x = 02$ and $y = 0$ (where 0 indicates "the state of nonoscillation" and 1 referred below indicates "the state of oscillation" generating an output of level 1), the outputs $\bar{x}$ and $\bar{y}$ become 1. In this case, since so that the quenching inputs the level 1 is applied to the laser element ZL1, the quenching input of the laser element ZL1 becomes 3 since each of the quenching inputs C, $\bar{x}$ and $\bar{y}$ assumes the state 1. On the contrary, the quenching input of the laser element ZL2 become 0 since each of the quenching inputs $x$ and $y$ assumes the state 0.

At a time $t_2$, the bistable laser Z is pumped and either laser element ZL1 or ZL2 oscillates. In this case, since the quenching inputs 3 and 0 are respectively applied to the laser elements ZL1 and ZL2, the laser element ZL2 receiving a smaller quenching input 0 oscillates and generates an output $\bar{z}$ (=1) and the laser element ZL1 receiving a larger quenching input 3 is quenched and generates an output $z$ (=0). In other words, the output $z$ becomes the state 0 in response to the quenching inputs $x$ =0 and $y$ =0. At a time $t_3$, the pumping inputs of the bistable laser X and Y is terminated and the oscillation of the bistable lasers X and Y is stopped, so that the quenching inputs of the bistable laser Z is terminated. However, since the bistable laser Z is further pumped, the logic result is kept and applied to the just succeeding stage.

In case where $x$ =1, $y$ =0, $\bar{x}$ =0 and $\bar{y}$ =1, the quenching input of the laser element ZL1 becomes 2. On the contrary, the quenching input of the laser element ZL2 becomes 1. In this case, since the laser element ZL2 becomes 1. In this case, since the laser element ZL2 has a smaller quenching input 1 than the other quenching input 2, the laser elements ZL1 and ZL2 generates outputs 0 and 1 respectively. In other words, the bistable laser Z generates an output $z$ =0 in response to the quenching inputs $x$ =1 and $y$ =0.

In case where $x$ =0 and $y$ =1, the bistable laser Z generates similarly an output $z$ =0.

In case where $x$ =1, $y$ =1, $\bar{x}$ =0 and $\bar{y}$ =0, since the quenching inputs of the laser elements ZL1 and ZL2 become levels 1 and 2 respectively, the laser elements ZL1 and ZL2 generate outputs $z$ =1 and $\bar{z}$ =0 respectively. In other words, the bistable laser Z generates an output $z$ =1 in response to the quenching inputs $x$ =1 and $y$ =1.

The above mentioned operations can be indicated in Table 1.

Table 1

| x | y | z |
|---|---|---|
| 0 | 0 | 0 |
| 1 | 0 | 0 |
| 0 | 1 | 0 |
| 1 | 1 | 1 |

Table 2

| x | y | z |
|---|---|---|
| 0 | 0 | 0 |
| 1 | 0 | 1 |
| 0 | 1 | 1 |
| 1 | 1 | 1 |

As understood from the above table 1, the embodiment shown in FIG. 1A operates as an AND circuit.

An embodiment shown in FIG. 1B is almost similar to the embodiment shown in FIG. 1A except that the constant input C is applied to the laser element ZL2. In case where $x$ =0 and $y$ =0 (i.e.; $\bar{x}$ =1 and $\bar{y}$ =1), the quenching inputs of the laser elements ZL1 and ZL2 become respectively levels 2 and 1 so that the laser element ZL2 generates an output $z$ =0. In case where $x$ =1 and $y$ =0, the quenching inputs of the laser elements ZL1 and ZL2 become respectively levels 1 so that the laser element ZL1 generates an output $z$ =1. In case where $x$ =0 and $y$ =1, the laser element ZL1 generates similarly an output $z$ =1. In case where $x$ =1 and $y$ =1, the quenching inputs of the laser elements ZL1 and ZL2 become respectively levels 0 and 3 so that the laser element ZL1 generates an output $z$ =1. The above operation is indicated in Table 2. As understood from the table 2, the embodiment shown in FIG. 1B operates as an OR circuit.

Figures 1C, 1D:
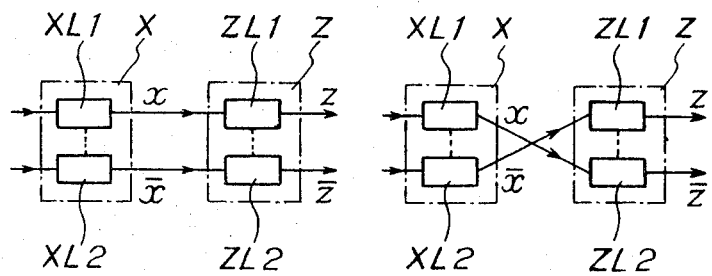
FIG. 1C shows a block diagram of an embodiment of the optical logic circuit of this invention to form a NOT circuit.
FIG. 1D shows a block diagram of an embodiment of the optical logic circuit of this invention to form a shift register.

If an NOT circuit is desirable, outputs of laser elements XL1 and XL2 of a controlling bistable laser X are respectively applied to laser elements ZL1 and XL2 as shown in FIG. 1C. In this case, the output states ($z$ =0 and $\bar{z}$ =1) or ($z$ =1 and $\bar{z}$ =0) are obtained in response to the quenching inputs ($x$ =1 and $\bar{x}$ =0) or ($x$=0 and $\bar{x}$ =1) respectively. Accordingly, the NOT circuit can be obtained by coupling between the controlling bistable laser X and the controlled bistable laser Z without provision of other means.

An embodiment shown in FIG. 1D is a shift register for shifting the output state of a preceding bistable laser to a succeeding bistable laser. In this circuit, the outputs $x$ and $\bar{x}$ are respectively applied to laser elements ZL2 and ZL1 after exchange as shown in FIG. 1D. As the result of such formation, the output states (e.g.; $x$ =1 and $\bar{x}$ =0, or $x$ =0 and $x$ =1) can be shifted as the output states (e.g.; $z$ =1 and $z$ =0, or $z$ =0 and $\bar{z}$ =1 in response to the above examples respectively) of the laser elements ZL1 and ZL2 as the are.

As mentioned above, AND circuits, OR circuits, NOT circuits and shift registers can be realized by the optical logic circuits of this invention. Since all the logic operations can be generally performed by AND circuits and NOT circuits or by OR circuits and NOT circuits, all the logic operation can be performed by the optical logic circuits of this invention.

Figure 5A:
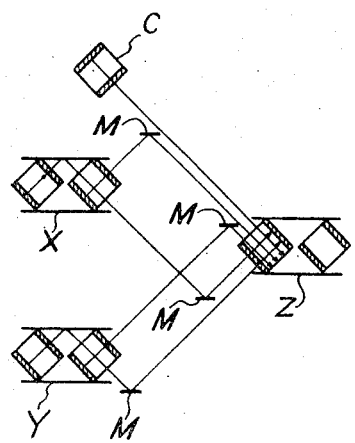
FIG. 5A and 5B show respectively sectional views of actual examples of the optical logic circuit of this invention.
Figure 5B:
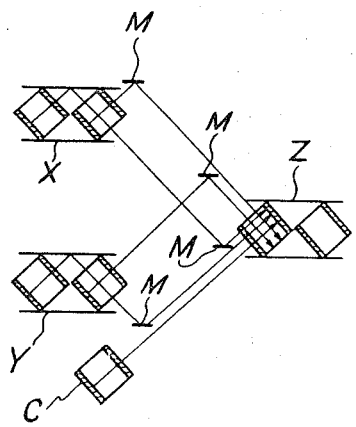

FIG. 5A and 5B illustrate actual examples of the optical logic circuits of this invention. In this case, FIG. 5A shows an example of AND circuit and FIG. 5B shows an example of OR circuit. In these FIGS. 5A and 5B, notations X, Y and Z are representative of bistable lasers similarly as in FIGS. 1A and 1B. A laser element C generates a constant output. Outputs of the bistable lasers X and Y are reflected at mirrors M. In this example, output lights (quenching inputs of the controlled bistable laser) are combined with each other by use of total reflective mirrors. However, if half-mirrors are employed, necessary spaces becomes smaller since the quenching inputs can be combined at small spaces.

As the above-mentioned laser elements, semiconductor laser elements are desirable in view of small size, high switching characteristic and small power consumption. Such semiconductor laser element can be pumped by a DC current pumping up to the threshold energy level and a sharp pulse current. However, the pumping by a sharp light pulse is suitable.

In the above description, the optical logic circuit of this invention comprises two groups (i.e.; a controlling group and a controlled group) which are pumped by respective ones of two-phase pumping inputs for simple description and illustration. However, the optical logic circuit of this invention may be composed of a plurality of successive stages which are pumped by respective ones of polyphase pumping inputs. In this case, it is necessary that the polyphase pumping inputs are successively switched at overlapped periods to pump successively the plural stages.

We claim:

1. An optical logic circuit, comprising a plurality of bistable devices each having two laser elements, said devices being divided into a plurality of groups connected in cascade arrangement, two outputs of each of the bistable laser devices having complement relationship to each other, polyphase pumping means having two outputs which are successively switched at overlapped periods, said bistable laser devices having inputs connected to said outputs, wherein two outputs of at least one bistable laser device of one of said groups are employed to quench respectively different laser elements of at least one bistable laser device of a just succeeding group.

2. An optical logic circuit according to claim 1, in which the optical logic circuit comprises a controlling group of at least one bistable laser device and a controlled group of at least one bistable laser device.

3. An optical logic circuit according to claim 2, in which the controlling group comprises two bistable laser devices and the controlled group comprises a bistable laser device, a constant quenching input being applied to a laser element of the bistable laser device of the controlled group, the laser element generating an output when the bistable laser device of the controlled group assumed the state 1, whereby the optical logic circuit performs AND operation at the controlled group.

4. An optical logic circuit according to claim 2, in which the controlling group comprises two bistable laser devices and the controlled group comprises a single bistable laser device, a constant quenching input being applied to a laser element of the bistable laser device of the controlled group, the laser element generating an output when the bistable laser device of the controlled group assumes the state 0, whereby the optical logic circuit performs OR operation at the controlled group.

5. An optical logic circuit according to claim 2, in which the controlling group comprises a bistable laser device and the controlled group comprises a bistable laser device, and in which a laser element of the bistable laser device of the controlling group generating an output when the bistable laser device of the controlling group assumes the state 1 supplies a quenching input to a laser element of the bistable laser device of the controlled group generating an output when the bistable laser device of the controlled group assumes the state 1, whereby the optical logic circuit performs NOT operation at the controlled group.

6. An optical logic circuit according to claim 2, in which the controlling group comprises a bistable laser device and the controlled group comprises a bistable laser device, and in which a laser element of the bistable laser device of the controlling group generating an output when the bistable laser device of the controlling group assumes the state 1 supplies a quenching input to a laser element of the bistable laser device of the controlled group generating an output when the bistable laser device of the controlled group assumes the state 0, whereby the optical logic circuit forms a shift register to shift a binary information from the controlling group to the controlled group.

7. An optical logic circuit, comprising: a plurality of bistable lasers divided into a controlling group and a controlled group, the controlling group comprising two bistable lasers, the controlled group comprising a single bistable laser, each of the bistable lasers comprising two laser elements and generating two outputs having complement relationship to each other, means for pumping the controlling group and the controlled group by polyphase pumping inputs which are successively switched at overlapped periods, means for applying the two outputs of each of two bistable lasers of the controlling group to the controlled group to quench respectively different laser elements of the bistable laser therein, and means for applying a constant quenching input to one of said two laser elements of the bistable laser in the controlled group.